(12) United States Patent
Zeller et al.

(10) Patent No.: US 6,168,819 B1
(45) Date of Patent: Jan. 2, 2001

(54) CAPPUCCINO CREAMER WITH IMPROVED FOAMING CHARACTERISTICS

(75) Inventors: Bary Lyn Zeller, Glenview, IL (US); Raymond Martin McGarvey, Middle Village; James Anthony Schulok, Garnerville, both of NY (US)

(73) Assignee: Kraft Foods, Inc., Northfield, IL (US)

( * ) Notice: Under 35 U.S.C. 154(b), the term of this patent shall be extended for 0 days.

(21) Appl. No.: 09/286,705

(22) Filed: Apr. 6, 1999

(51) Int. Cl.[7] .................................. A23C 1/04; A23F 5/34
(52) U.S. Cl. ........................ 426/569; 426/583; 426/586; 426/588; 426/591; 426/596; 426/594; 426/471; 426/443
(58) Field of Search ..................... 426/580, 586, 426/588, 656, 657, 591, 596, 569, 583, 471, 443, 594, 595

(56) References Cited

U.S. PATENT DOCUMENTS

| | | | |
|---|---|---|---|
| 3,852,506 | 12/1974 | Burge et al. | 426/453 |
| 4,043,990 | 8/1977 | Melachouris | 260/112 |
| 4,089,987 | 5/1978 | Chang | 426/564 |
| 4,438,147 | 3/1984 | Hedrick, Jr. | 426/570 |
| 4,490,403 | 12/1984 | Pisecky et al. | 426/453 |
| 4,734,287 | 3/1988 | Singer et al. | 426/41 |
| 4,746,527 | 5/1988 | Kuypers | 426/569 |
| 4,748,040 | 5/1988 | Kuypers | 426/569 |
| 4,782,138 | 11/1988 | Rialland et al. | 530/366 |
| 4,790,998 | 12/1988 | Swartz | 426/585 |
| 4,985,270 | 1/1991 | Singer et al. | 426/515 |
| 5,217,741 * | 6/1993 | Kawachi | 426/583 |
| 5,230,902 * | 7/1993 | Gold | 424/535 |
| 5,290,571 * | 3/1994 | Bounous | 426/72 |
| 5,350,590 * | 9/1994 | McCarthy | 426/285 |
| 5,358,730 * | 10/1994 | Dame-Cahagne | 426/583 |
| 5,451,412 * | 9/1995 | Bounous | 426/72 |
| 5,494,696 * | 2/1996 | Hoest | 426/589 |
| 5,609,904 | 3/1997 | Koh et al. | 426/565 |
| 5,620,733 | 4/1997 | Chaveron et al. | 426/580 |
| 5,721,003 * | 2/1998 | Zeller | 426/594 |
| 5,780,092 * | 7/1998 | Agbo | 426/594 |
| 5,824,357 | 10/1998 | Chaveron et al. | 426/580 |
| 5,902,630 * | 5/1999 | Imai | 426/583 |

FOREIGN PATENT DOCUMENTS

| | | | |
|---|---|---|---|
| 0412590 | 2/1991 | (EP) | A23J 1/20 |
| 04891715 | 1/1999 | (EP) | A23F 5/40 |

OTHER PUBLICATIONS

Wong 1988 Fundamentals of Dairy Chemisty 3rd Edition p26–27 Van Nostrand Reinhold Co., New York.*

* cited by examiner

*Primary Examiner*—Carolyn Paden
(74) *Attorney, Agent, or Firm*—Thomas A. Marcoux

(57) ABSTRACT

A particulate creamer comprising protein, lipid, and carrier, in which more than 50% by weight of the protein is partially denatured whey protein, the partially denatured whey protein being from 40 to 90% denatured. The creamer is particularly suitable for foaming creamer compositions. The foaming creamer composition, when added to a brewed hot coffee beverage, produces a large amount of a creamy and semi-solid foam. The creamer is preferably prepared by heat treating a slurry comprising the protein, lipid and carrier constituents of the creamer to effect denaturation of the whey protein, followed by spray drying the slurry. The creamer may also be employed in dry mix instant cappuccino compositions.

46 Claims, No Drawings

CAPPUCCINO CREAMER WITH IMPROVED FOAMING CHARACTERISTICS

BACKGROUND OF THE INVENTION

Particulate creamers, i.e. particulate products for whitening coffee, tea and other beverages, have been known for many years and are in wide use. Particulate creamers include a lipid, a carrier, and protein and are usually made by spray drying an aqueous slurry.

Particulate creamers are also used for whitening of beverages, such as hot cappuccino, which are characterized by a surface foam. Particulate non-foaming creamers produced by conventional spray drying methods, when dissolved in hot water, coffee, or the like, will cause the formation of negligible surface foam. The amount of foam produced by dissolution of the creamer particles can be increased by injecting an inert gas during spray drying. Foam may also be obtained by utilizing chemical carbonation reagents with the particulate creamer. Gas-injected particulate creamers are described, for example, in Hedrick, U.S. Pat. No. 4,438,147, Kuypers, U.S. Pat. No. 4,746,257, and Kuypers, U.S. Pat. No. 4,748,040. Chemical carbonation systems suitable for use with particulate creamers are described, for example, in Agbo et al., U.S. Pat. No. 5,780,092 and Zeller et al., U.S. Pat. No. 5,721,003. A chemical carbonation system may also be employed with a gas-injected creamer.

Hot cappuccino beverages may be prepared from brewed coffee or from instant hot cappuccino dry-mix compositions containing instant coffee such as those described in the Agbo et al. and Zeller et al. patents mentioned above.

It is an object of the present invention to provide a particulate creamer which, upon reconstitution in a hot coffee beverage, provides a thick, creamy foam having a semi-solid texture similar to that of the surface foam provided by steamed milk in conventional brewed hot cappuccino beverages.

It is a further object of the invention to provide such a particulate creamer which provides such foam when reconstituted in a hot brewed coffee beverage.

It is a further object of the invention to provide such a particulate creamer which contains chemical carbonation reagents which augment the amount of such foam.

It is a further object of the invention to provide particulate, dry mix, instant hot cappuccino compositions which contain such particulate creamers.

It is a further object of the invention to provide a spray drying method for preparing such particulate creamers and to provide a spray-dryable aqueous composition useful in the spray drying method.

BRIEF SUMMARY OF THE INVENTION

The foregoing and other objects which will be apparent to those of ordinary skill in the art from the detailed description which follows are achieved in accordance with the invention by providing:

a particulate creamer comprising protein, lipid, and carrier, in which more than 50% by weight of said protein is partially denatured whey protein, said partially denatured whey protein being from 40 to 90% denatured;

a particulate creamer as just described further comprising chemical carbonation reagents;

a method of preparing a particulate creamer which comprises providing an aqueous spray-dryable slurry which comprises protein, lipid and carrier, more than 50% by weight of said protein being whey protein, heating said aqueous slurry at a temperature and for a time sufficient to denature said whey protein such that the whey protein is 40 to 90% denatured, and spray drying said aqueous slurry to provide a particulate creamer comprising protein, lipid, and carrier wherein more than 50% of said protein is whey protein which is from 40 to 90% denatured; and a particulate, dry mix, instant hot cappuccino composition comprising water soluble coffee and a particulate creamer in accordance with the invention.

DETAILED DESCRIPTION OF PREFERRED EMBODIMENTS

A particulate creamer in accordance with the invention include, as essential constituents, protein, lipid, and carrier.

The major constituent of the protein component of the present creamers is whey protein. More than 50% by weight, preferably at least 67% by weight, and more preferably at least 75% by weight, of the protein is whey protein. The whey protein is from 40–90% denatured, preferably 50–80% denatured, and more preferably 60–75% denatured. If the whey protein denaturation is less than 40%, the semi-solid foam texture is not realized. Denaturation in excess of 90% will produce an amount of functional undenatured whey protein which is insufficient to adequately emulsify and incorporate the oil in the creamer slurry.

The total protein content of the creamer, as well as the content of partially denatured whey protein by weight, is suitably about 3–30%, preferably 5–20% and more preferably 10–15% by weight. These percentages and others set forth hereinafter are on a dry weight basis and are based on the solids content of the composition in question.

The extent of protein denaturation may be determined by the well established technique of differential scanning calorimetry (DSC) in which the amount of heat absorption during complete thermal denaturing of a whey protein creamer is compared with heat absorption during complete thermal denaturing of a completely undenatured reference. A suitable reference is freeze-dried whole milk (FDWM) having the same lipid and moisture content as the whey protein creamer. The whole milk reference is appropriate because whey protein powders which do not contain encapsulated lipid do not have the mobility to be properly and completely denatured during the DSC scan. The DSC technique is further described in connection with Example 1.

The partially denatured whey protein component of the creamer can be obtained from any source of whey protein, but is preferably obtained from a whey protein concentrate or a whey protein isolate.

Whey protein concentrate (WPC) powder is prepared from liquid whole milk by separating the fat from the milk, acid-precipitating casein from solution, subjecting the solution to ultrafiltration to remove a portion of the lactose from solution, and spray-drying. WPC powders generally contain 25 to 80% protein by dry weight. Whey protein isolate (WPI), on the other hand, is WPC from which a greater amount of lactose has been removed by ultrafiltration. WPI powders contain over 80% protein by dry weight. WPC and WPI are both prepared under mild conditions to prevent protein denaturation. Any denatured proteins which do form during processing are excluded from the product during ultrafiltration. The result is an undenatured whey protein powder which retains excellent water solubility, protein functionality, and nutritional quality. A wide variety of whey protein powders are commercially available which have been designed to provide special characteristics such as improved damage from high temperature thermal processing or from acidic environments.

The heat-sensitive globular protein β-lactoglobulin accounts for more than 60% of the protein in whey powders. β-lactoglobulin can undergo time- and temperature-dependent denaturation when solutions of whey protein are heated to over 65° C. During denaturation, its structure partially unfolds, exposing hydrophobic groups and reactive sulfhydryl groups which can enter into polymerization reactions resulting in gelation and reduced solubility. Other protein fractions in whey protein also undergo denaturation, but most of the functionality of whey protein is derived from β-lactoglobulin.

The objective of the present invention is to utilize in the creamer slurry whey protein which has been partially denatured to an extent sufficient to reduce its solubility and such that it will provide a considerable amount of hydrated uniformly dispersed insoluble protein to act as an effective gas entrapping medium, foam texturizer, and stabilizer when the spray-dried creamer is reconstituted in a beverage, particularly when combined with a chemical carbonation system. The product of the invention contains buoyant, hydrated, insoluble, non-colloidal, irregularly shaped, whey protein particles, approximately 10–200 microns in size, with an average particle size of about 60 microns, which would not provide coffee whitening or creamy mouthfeel without inclusion of a significant amount of encapsulated fat. The large particle size of the denatured protein in the present creamer surprisingly does not impart an objectionable mouthfeel likely due to a combination of several factors: the denatured protein is extensively hydrated; it contains encapsulated fat and air bubbles; and it is concentrated in the foam to an extent which imparts a desirable semi-solid texture.

It was surprisingly found that a considerable portion of the whey protein could be extensively denatured and its solubility greatly reduced without resulting in either destabilization of the oil-in-water emulsion formed after thorough mixing of the creamer components, or precipitation of protein aggregates in a reconstituted beverage. The partially denatured protein is easily suspended in the beverage and is preferentially suspended in the foam, especially when chemical carbonation reagents are used to supplement foam volume. It appears that gas bubbles easily become attached to and provide buoyancy to the somewhat hydrophobic, suspended partially denatured protein to carry it to the surface of the beverage where it builds and stabilizes the foam. An even more surprising result is that creamers spray-dried without gas injection under conditions which produce a moderate to high density powder possess a sufficient amount of entrapped gas and/or inherent whey buoyancy to provide a smaller, but continuous and stable, foam layer in a beverage reconstituted without the use of chemical carbonation reagents.

Any method and conditions capable of denaturing the whey protein can be employed. Denaturation is most conveniently carried out by heating the whey protein at a temperature of over 140° F. for a time sufficient to alter its structure and reduce its solubility to an extent that provides a considerable amount of hydrated insoluble protein that acts as an effective gas entrapping medium, foam texturizer, and stabilizer when the foamed creamer is reconstituted in a beverage. This heating step is preferably conducted by heating a slurry of undenatured whey protein at a temperature of 140° to 160° F. for a time sufficient to effect a desired extent of denaturation in accordance with the invention. In general, a time period within the range of 15 minutes to two hours will be suitable, depending on the temperature and desired extent of denaturation. Higher temperatures can be used to shorten heating time, such as would prevail in established HTST or UHT methods. The denaturation of the whey protein can be conducted before preparing the creamer and the denatured whey protein thereafter mixed with the other components of the creamer. Most advantageously, however, the denaturation is effected by first preparing the creamer slurry and then heating the slurry, preferably at a pH of 6.5 to 7.5. As mentioned above, the partially denatured whey protein component is suitably present in the dry mix or precursor creamer of the invention in an amount of about 3 to 30% by weight, preferably 5 to 20% by weight and most preferably 10 to 15% by weight on a dry weight basis.

The creamer of the invention is particularly effective when dry mixed with chemical carbonation reagents, and optionally with other ingredients such as sweeteners, and flavors, for reconstitution in a hot beverage, especially brewed coffee, to produce a whitened beverage which is characterized by a creamy semi-solid surface foam comprising gas bubbles trapped within a hydrated insoluble protein suspension. The foam is closer in appearance and texture to steamed milk foam than to conventional instant cappuccino foam. The suspended hydrated partially denatured whey protein particles in the creamer provide a thick blanket which effectively coats and traps the gas bubbles in the foam. Not only is greater volume of foam generated, but an opaque, rich, creamy appearance more characteristic of steamed milk is provided due to virtual disappearance of the gas bubbles. In contrast, foams produced from conventional instant cappuccino powders typically appear much more watery and less creamy since the gas bubbles in the foam are coated by thinner, fairly transparent films which can give the foam an appearance more like soap bubbles than steamed milk.

It was surprising that when used with chemical carbonation reagents, the creamer provides a greater volume of foam having a creamier texture when used in brewed coffee than in instant cappuccino. It is believed that because brewed coffee is an acidic beverage, the bicarbonate in the creamer powder reacts instantly to produce a greater number of smaller bubbles which are more uniformly dispersed throughout the beverage. Also it is believed that the acidity causes formation of a greater amount of insoluble whey protein in brewed coffee. Unlike casein, undenatured whey protein is not pH-sensitive and readily dissolves in acidic solution. However, whey protein is rendered increasingly pH-sensitive with denaturation, resulting in lowered solubility in acidic solution. Therefore, adding the creamer to brewed coffee (pH~5) should produce a greater amount of hydrated insoluble protein than when the creamer is added to water.

It is a particular advantage that the creamer of the invention may contain no casein. Use of conventional creamers containing casein in combination with citric or other strong acids results in formation of floating protein aggregates on the surface of the beverage which become visible after the foam dissipates. The formation of such aggregates is easily avoided by providing a casein-free creamer in accordance with the invention. However, it is possible to use a creamer according to the invention which also contains a limited amount of casein, either dry-mixed or inherent in the creamer, without producing undesirable rafts of floating casein aggregates. The semi-solid hydrated partially denatured whey protein will hide the denatured casein.

Localized denaturation of protein leads to the formation of undesirable floating aggregates. However, if the creamer contains uniformly partially denatured protein, then aggregates with a foreign appearance do not occur. It is believed that localized casein denaturation occurs in the vicinity of each citric or other acid crystal when the acid dissolves into a beverage containing the soluble creamer. These denatured proteins then aggregate into large clumps, typically 5–50 in number, on the surface of the beverage. Non-fat dry milk (NFDM) is typically used to formulate instant cappuccino creamers. NFDM contains approximately 37% protein, of which about 80% is casein. Therefore, traditional creamers contain a significant amount of casein which can not escape denaturation with citric and other acids used in chemical carbonation systems. In contrast, the denatured whey creamer of the present invention contains a countless number (probably millions) of evenly dispersed partially denatured protein particles having an average particle size of from 20 to 100 microns which give the foam a uniform appearance. If the beverage contains a minor amount of denatured casein, it can be dispersed throughout the semisolid foam, masking its appearance and preventing aggregation into large particles. Thus, the present creamer can tolerate some amount of casein provided that the whey is sufficiently partially denatured in accordance with the invention.

Partial denaturation of whey results in greater foam volume and texture, but lower beverage whitening as compared to conventional coffee whiteners. Therefore it is an advantage that the creamer may include casein or other protein to enhance beverage whitening while still retaining desirable foaming performance. The denatured whey:casein ratio of the protein of the creamer of the invention is greater than 1:1, preferably at least 2:1, and more preferably at least 3:1. Moreover, as mentioned above, the creamer may be casein-free.

The lipid component of the foaming creamer particles can be a dairy or non-dairy fat, preferably having a melting point of at least 100° F. Suitable non-dairy fats include partially hydrogenated vegetable oil having a melting point of about 100° to 120° F. Preferred non-dairy lipids include partially hydrogenated soybean oil, coconut oil, and palm kernel oil.

Total lipid content of the creamer, including any lipid that is present as such or which may be present with the proteinaceous component or the carrier component of the creamer, is suitably 5 to 50%, preferably 10 to 35% and more preferably 25 to 35%, based on the weight of the dry mix creamer.

Suitable carriers are spray-drying carriers and include gum arabic and water soluble carbohydrates, such as maltodextrin, lactose, corn syrup solids, and sugars. Preferred water soluble carbohydrates include corn syrup solids or lactose or, for a sugar-free product, maltodextrin. The total amount of carrier in the creamer particles is generally about 20 to 92%, preferably 30 to 55%, based on the weight of the creamer.

Carrier may be added separately or may be present along with the protein constituent of the creamer. For example, whey protein powders may contain lactose. Where reference is made to the carrier content of the creamer particles, the content is intended to include all of the carrier that is present in the creamer particles, and not just carrier which may be present in the creamer particles as such. The same is true with respect to the protein content and the lipid content of the creamer.

Optionally, emulsifiers such as a modified starch or a surfactant commonly added to creamers may also be included. When the creamer contains a sufficient amount of a partially denatured whey protein in accordance with the invention, the addition of such emulsifiers will not be required since the partially denatured whey protein inherently provides this function. When used, a preferred modified starch component is a water-soluble emulsion-stabilizing lipophilic food starch such as N-Creamer-46 starch (National Starch and Chemical Company) in an amount of about 5 to 20% by weight of the creamer. The preferred surfactant is a high HLB emulsifier, such as sodium stearoyl lactylate or polysorbate.

In a preferred method of preparing the creamer, undenatured whey protein, lipid, carrier, and optional ingredients are slurried with water, and the slurry is heated in a manner discussed above to partially denature the whey protein. The resulting mixture is then preferably homogenized before spray drying. Alternatively, the whey protein may be partially denatured beforehand and mixed with the other creamer components to form an aqueous slurry therewith.

The aqueous composition which forms the precursor of the creamers comprises solids in an amount sufficient to permit the slurry to be spray dried in conventional equipment. Generally, the solids content of such slurries will be from 30–70%, preferably 45–60% by weight, based on the weight of the slurry.

Spray drying may be carried out with or without gas injection. Where gas injection is not carried out, density of the creamer particles is generally about 0.25–0.55 g/cc and preferably about 0.3–0.4 g/cc. When gas injection is carried out, density is generally about 0.1 to 0.25 g/cc and preferably about 0.15–0.2 g/cc. Suitable gasification techniques are disclosed in U.S. Pat. No. 4,438,147; U.S. Pat. No. 4,746,257; and U.S. Pat. No. 4,748,040. It is a particular advantage of the invention that the creamer particles can be dry-mixed with chemical carbonation reagents without causing the formation of visible floating casein aggregates. High density creamers, i.e. those having a density of about 0.25 to 0.55 g/cc are preferred for such products.

The creamers may be used alone to whiten coffee beverages and at least in a brewed coffee beverage will create a significant but generally low amount of a creamy and solid foam which is similar to that of steamed milk foam and which has a high degree of consumer liking, particularly with respect to foam appearance and texture. However, it is a significant advantage that the partially denatured whey creamers of the invention can be dry mixed with chemical carbonation reagents to provide foaming creamers which produce large amounts of foam, particularly when used to whiten brewed coffee, without forming undesirable floating casein aggregates.

Particulate chemical carbonation reagents may be dry-mixed with the spray dried creamer particles to form the preferred foaming creamer compositions of the invention. The creamer particles of the preferred compositions may be gasified, but are preferably non-gasified.

Suitable chemical carbonation components include a food grade acidulant and an alkali metal bicarbonate or carbonate. The food grade acid is in particulate form, and can be any food grade acid or acids capable of rapidly neutralizing the bicarbonate or carbonate component. Preferred food grade acids include citric acid. Less preferred food grade acids include organic acids such as malic, fumaric, lactic, and tartaric acid, glucono-delta-lactone, acidic food grade gums such as alginic acid, gum arabic, low methoxy pectin and modified cellulose gums, and leavening acids. The term "acid" as used herein to describe the acidic chemical carbonation reagent is intended to include acid salts or anhydrides.

The bicarbonate or carbonate component of the chemical foam-generating system is soluble in hot water, is preferably provided in particulate form, and is preferably a bicarbonate, more preferably an alkali metal bicarbonate, and most preferably potassium bicarbonate. A sodium salt may also be used but the potassium salt can be used in a greater amount without an adverse effect on beverage flavor.

The amount of the bicarbonate or carbonate to be included in the creamer is dependent on the amount of foam which is intended to be produced. A preferred amount of the bicarbonate or carbonate, when present, is from 1 to 7% and more preferably from 2 to 5%, based on the creamer weight. The amount of acid reagent to be included in the creamer preferably depends on the acidity of the coffee beverage to be whitened. In order to reduce cost, it is preferred to use as little of the acid reagent as possible, while at the same time causing full neutralization of the bicarbonate or carbonate in order to maximize the amount of $CO_2$ generated. Since the coffee beverage will have some acidity, it is therefore preferred to use less acid reagent than would be required to fully neutralize the bicarbonate or carbonate in the absence of the acidity of the coffee beverage. In general, the amount of acid will suitably be from 50 to 100%, and preferably from 75 to 100%, of the amount of acid that would be required, by itself, to fully neutralize the bicarbonate or carbonate.

The creamers may be packaged and used as such or they may be dry-mixed with chemical carbonation reagents, sweeteners, flavors, and other ingredients conventional in spray dried powder creamers. The creamers may also be used in particulate, instant hot cappuccino compositions. It is preferred, however, to dry mix the creamer with chemical carbonation reagents, preferably with a sweetener and optional flavor, for providing a foaming creamer for a brewed coffee beverage.

When a sweetener is present with the creamer, it is present in an amount such that the coffee beverage is appropriately sweetened when an amount of the sweetened creamer is used which will whiten a coffee beverage to a generally acceptable amount and/or which will provide a coffee beverage with a generally acceptable amount of surface foam. Where sucrose is the sweetener, an amount of from 50 to 200%, based on the weight of the creamer, is generally suitable. Other sweeteners, both natural and artificial and either alone or in combination may be employed, preferably in an amount to give essentially the same amount of sweetness as sucrose in the amount stated.

When it is desired to reduce or eliminate the sugar content of the formulation and incorporate one or more artificial sweeteners, a bulking agent such as maltodextrin may be substituted for substantially the same amount of sugar. Thickening agents, such as food grade gums, may also be employed to enhance mouthfeel of the beverage.

The creamers of the present invention may also be employed in particulate dry mix instant hot cappuccino compositions which generally include a soluble coffee component, a foaming creamer component (which may be a gas-injected creamer, a non-gas-injected creamer combined with chemical carbonation reagents, or both) a sweetener component, and optional ingredients such as bulking agents, flavor, and the like. The present denatured whey creamers may be substituted for some or all of the creamer component of such compositions.

EXAMPLE 1

This example demonstrates the difference in foaming performance between creamers having the same composition but different degrees of denaturation.

A batch tank was filled with water and the water heated to 120° F. A dry mix of 15 parts by weight New Zealand Milk Products, Inc. Alacen 855 Whey Protein Concentrate (WPC) and 55 parts by weight 24 DE corn syrup solids (CSS) was added to the heated water and mixed for 15 minutes. 30 parts by weight of melted partially hydrogenated soybean oil (PHSBO) was added and mixed for 15 minutes while raising the temperature to 160° F. for 45 minutes. A portion of the slurry was homogenized using a two-stage homogenizer, set to 2200 psi for the first stage and 500 psi for the second stage, and spray-dried through a high-pressure nozzle at 600 psi to make Creamer A.

The remaining slurry was maintained at 160° F. for an additional 45 minutes (90 minutes total) and another portion then homogenized and spray-dried to make Creamer B. The final remaining slurry was maintained at 160° F. for an additional 30 minutes (120 minutes total) and then homogenized and spray-dried to make Creamer C. All three dried creamers had a moisture content of less than 3% and were composed of 15% WPC, 30% PHSBO, and 55% CSS on a dry weight basis. Dried Creamer A had on off-white color, Creamer B a light yellow color, and Creamer C a darker yellow color similar to that of butter.

The extent of whey protein denaturation in each spray-dried creamer was measured using Differential Scanning Calorimetry (DSC). For each creamer, two distinct regions of heat absorption corresponding to melting of the encapsulated PHSBO, centered at 95° F., and denaturation of whey protein, centered at approximately 160° F., were identified. A re-scan of the same samples produced only the PHSBO melting region since the whey protein was completely and irreversibly denatured as a result of the first scan. The more the whey protein is denatured during creamer production, the less heat it absorbs during the DSC scan. The extent of whey protein denaturation was calculated for each creamer by subtracting the measured DSC whey protein heat absorption from that of a completely undenatured Freeze-Dried Whole Milk (FDWM) reference having the same encapsulated fat level. The extent of the denaturation of the whey protein in each of the creamers is reported in Table 1.

Light microscopy was used to document the comparably large size of the denatured whey protein particles in the product of the present invention which clearly distinguishes it from conventional foaming cappuccino creamers. Analysis of Creamer B revealed the widespread presence of irregularly shaped, large denatured whey particles approximately 10–200 microns in size, with an average particle size of about 60 microns. Similar analysis of a control product, a conventional gasified foaming cappuccino creamer used commercially to formulate Maxwell House Cafe™ Cappuccino, revealed only very small (approximately micron-sized) particles. The hydrated insoluble protein particles in the present creamer have sufficient buoyancy to float and build on the surface of the beverage, when reconstituted, to create a small head of semi-solid foam, even without gas injection during spray-drying or the use of chemical carbonation reagents. Microscopy also revealed the presence of numerous protein-encapsulated air bubbles in the creamer which surely contribute to buoyancy.

Creamer foaming performance was measured by dry blending with sugar and chemical carbonation reagents and reconstituting the mixture with 250 mL of 160° F. brewed coffee in a graduated 60 mm-wide cylindrical column and measuring the thickness of the foam head versus time. The mixture was comprised of 9.8 g of creamer containing 1.5 g WPC containing 1.2 g whey protein, 10.0 g sugar, 0.225 g citric acid, and 0.375 g potassium bicarbonate. A solid foam texture was obtained for each creamer. The initial foam height and foam height after one, two, three and five minutes, for each of the creamers are reported in Table 1.

TABLE 1

Foaming Performance versus Extent of Whey Protein Denaturation

| Creamer | WPC Content | Whey Protein Denaturation | Foam Type | Foam Initial (mm) | Foam 1 min. (mm) | Foam 2 min. (mm) | Foam 3 min. (mm) | Foam 5 min. (mm) |
|---|---|---|---|---|---|---|---|---|
| A | 15% | 49% | solid | 22 | 18 | 15 | 13 | 12 |
| B | 15% | 66% | solid | 24 | 20 | 18 | 16 | 14 |
| C | 15% | 74% | solid | 25 | 21 | 19 | 18 | 17 |
| D | 15% | 15% | gas | 10 | 7 | 6 | 5 | 4 |

COMPARISON EXAMPLE A

Creamer D having the same composition as creamers A, B and C was prepared by the general procedure as for creamers A, B and C but employed a milder thermal denaturation to produce only 15% denaturation of the whey protein. In this case the creamer slurry was held at 160° F. for only 10 minutes after addition of the Alacen 855 WPC. The creamer slurry was homogenized using a single-stage homogenizer at 500 psi and spray-dried using a high-pressure nozzle. Creamer D was tested as in Example 1. As reported in Table 1, creamer D produced a much smaller volume of foam having a gaseous texture.

EXAMPLE 2

This example demonstrates that a lipophilic starch can be used without adversely affecting the foaming performance of creamers containing whey protein. However, as shown in Comparison Example B, its use in formulating creamers without whey protein is not effective in producing stable foams. Dry-mix addition of undenatured or insufficiently denatured whey protein to such creamers is also not effective, as shown in Comparison Example C.

A batch tank was filled with water and heated to 160° F. A dry mixture of 10 parts by weight National Starch, Inc. N-Crearner-46 starch and 55 parts by weight 24 DE CSS was added and mixed for 15 minutes. 5 parts by weight Alacen 855 WPC was added and mixed for 15 minutes followed by addition of 30 parts PHSBO. The resulting 45%-solids slurry was held with continuous mixing at 160° F. for an additional 45 minutes and then homogenized and spray-dried to make Creamer E. The extent of whey protein denaturation was 70%.

The foaming performance of Creamer E was measured by dry blending it with chemical carbonation reagents and reconstituting the mixture with 240 mL of 160° F. brewed coffee in a graduated 60 mm-wide cylindrical column and measuring the thickness of the foam head versus time. The mixture used was comprised of 9.8 g of creamer containing 0.5 g WPC containing 0.4 g whey protein, 0.225 g citric acid, and 0.375 g potassium bicarbonate. A solid foam texture was obtained. The results are reported in Table 2.

COMPARISON EXAMPLE B

Creamer F was prepared using the procedure of Example 2 using 15 parts by weight N-Creamer-46, 55 parts by weight 24 DE CSS, 30 parts by weight PHSBO, and no WPC. 8.8 g creamer was dry blended with 1.0 g Alacen 855 WPC containing 0.8 g whey protein, 0.225 g citric acid, and 0.375 g potassium bicarbonate and the foaming performance measured using the method described in Example 2. As reported in Table 2, gaseous foam texture was obtained. Even though the mixture contained twice the level of whey protein as formulated in Creamer E, Creamer F exhibited very poor performance because the whey protein was undenatured.

COMPARISON EXAMPLE C

Creamer G was prepared using the procedure of Example 2 above except that the slurry was held for only 15 minutes after addition of the WPC. The creamer was formulated using 5 parts by weight N-Creamer-46, 15 parts by weight WPC, 50 parts by weight 24 DE CSS, and 30 parts by weight PHSBO. The extent of whey protein denaturation was 31%. 9.8 g creamer was dry blended with 0.225 g citric acid, and 0.375 g potassium bicarbonate and the foaming performance was measured as described in Example 2. A gaseous foam texture was obtained. The results are reported in Table 2. Even though the mixture contained the same amount of WPC as the creamers of Example 1, the extent of denaturation was insufficient to produce a solid foam.

TABLE 2

Foaming Performance of Creamers containing Starch

| Creamer | Creamer NPC Content | Starch Content | Extent of WPC Denaturation | WPC Added | Foam Type | Foam Initial (mm) | Foam 1 min. (mm) | Foam 2 min. (mm) | Foam 3 min. (mm) | Foam 5 min. (mm) |
|---|---|---|---|---|---|---|---|---|---|---|
| E | 5% (0.5 g) | 10% | 70% | — | solid | 24 | 20 | 18 | 17 | 16 |
| F | none | 15% | N/A | 1.0 g | gas | 12 | 4 | 0 | 0 | 0 |
| G | 15% (1.5 g) | 5% | 31% | — | gas | 15 | 11 | 9 | 8 | 7 |

EXAMPLE 3

This example demonstrates that a mixture of creamers having different extents of whey protein denaturation can be used to obtain intermediate foaming performance.

The highly denatured Creamer B from Example I was mixed with the minimally denatured Creamer D of Comparison Example A in varying proportions. The foam type and foaming performance was evaluated by reconstituting a dry blend containing 9.8 g creamer, 0.225 g citric acid, and 0.375 g potassium bicarbonate in 240 mL of 160° F. brewed coffee using the column described in Example 2. The results are summarized in Table 3. When the combined level of denaturation reached about 30% a slightly solid foam texture was obtained but the foam was still primarily gaseous. A solid foam texture was obtained when the combined level of denaturation reached about 40%.

TABLE 3

Foaming Performance of Creamer Mixtures having Different Extents of Denaturation

| Creamer D | Creamer B | Net Extent of Denaturation | Foam Initial (mm) | Foam 5 min. (mm) | Foam Texture | Beverage Whitening |
|---|---|---|---|---|---|---|
| 100% | — | 15% | 8 | 4 | gas | most white |
| 75% | 25% | 28% | 12 | 7 | gas/solid | more white |
| 50% | 50% | 40% | 16 | 9 | solid | moderate |
| 25% | 75% | 53% | 19 | 11 | more solid | less white |
| — | 100% | 66% | 23 | 13 | most solid | least white |

EXAMPLE 4

This example demonstrates that buffering the creamer slurry can produce an acceptable partially denatured whey protein creamer but may reduce foamability.

Creamer H was prepared according to the general methods described in Comparison Example A using an amount of slurry heating sufficient to effect 77% denaturation of the whey protein. In this case, the slurry containing the Alacen 855 WPC was held at 160° F. for 35 minutes and then heated to 180° F. prior to homogenizing and spray-drying. The creamer has the same composition as Example 1 creamers with the exception that 1 part by weight of trisodium citrate, an alkaline buffer, was added to the slurry after dissolution of the WPC. 0.8 g creamer was dry blended with 10 g sugar, 0.225 g citric acid, and 0.375 g potassium bicarbonate.

A solid foam was obtained upon reconstitution in 240 mL 160° F. coffee using the column described in Example 2. However, the presence of the buffer in the creamer somewhat reduced the volume of foam expected. Based on the level of denaturation, an initial foam height of at least 25 mm would be expected, but only 18 mm was obtained. It was found that addition of buffer to the creamer increases its solution pH and has the effect of reducing the amount of carbon dioxide generated from the reaction of the carbonation reagents. Increasing the amount of carbonation reagents can be used to increase foamability but may adversely affect the flavor of the coffee beverage.

EXAMPLE 5

This example demonstrates that the product of this invention can also be used to formulate instant cappuccino mixes containing instant coffee powder.

Creamers A and C were used to formulate instant cappuccino products including instant coffee as an ingredient. The cappuccino mixes, comprised of 10.0 g sugar, 9.8 g creamer, 2.0 g instant coffee, 0.225 g citric acid, and 0.375 g potassium bicarbonate, were reconstituted in 250 mL of 180° F. water and the foaming performance measured as in the previous examples. The results are summarized in Table 4.

TABLE 4

Foaming Performance Comparison - Brewed Coffee versus Instant Cappuccino Mix

| Creamer | Product Application | Foam Type | Foam Initial (mm) | Foam 1 min. (mm) | Foam 2 min. (mm) | Foam 3 min. (mm) | Foam 5 min. (mm) |
|---|---|---|---|---|---|---|---|
| A | Brewed Coffee | solid | 22 | 18 | 15 | 13 | 12 |
| C | Brewed Coffee | solid | 25 | 21 | 19 | 18 | 17 |
| A | Instant Cappuccino Mix | solid | 14 | 11 | 9 | 8 | 7 |
| C | Instant Cappuccino Mix | solid | 19 | 17 | 15 | 14 | 13 |

It was surprising that the creamer provided a lower volume of foam in a reconstituted instant cappuccino mix than when used in brewed coffee applications. It is believed that the acids in brewed coffee can react instantly with the bicarbonate in the mix to produce a greater volume of carbon dioxide and a greater number of smaller bubbles which are more resistant to rupture in the foam. By comparison, the reactivity of the acids in the instant coffee formulation is delayed since the coffee powder must first dissolve in the water.

EXAMPLE 6

This example demonstrates improvement in consumer liking which can be attained when whey protein creamer is adequately denatured.

Creamers D, G and B described in the previous examples having different levels of whey protein denaturation, 15%, 31%, and 66%, respectively, were used individually to formulate flavored, sweetened, instant cappuccino powders. Single servings of these dry blended powders, containing 9.5 g creamer, 12.0 g sugar, 0.5 g natural and artificial vanilla flavor, 0.18 g citric acid, and 0.375 g potassium bicarbonate, were pre-weighed into opaque cups for reconstitution with 8 oz. hot, freshly brewed Maxwell House coffee by 75 panelists in an independent consumer test. Another cappuccino powder was prepared using 9.59 Creamer B, 10.0 g sugar, 0.5 g natural and artificial vanilla flavor, and 3.0 g non-fat dried milk (NFDM) powder without chemical carbonation reagents for similar reconstitution and evaluation.

The panelists closely observed and tasted the products and rated the appearance of the foam and their overall liking of the beverage (combined appearance and flavor) for each product on a 10-point scale. A score of 10 indicates the highest possible degree of liking. Results are summarized in Table 5.

x

TABLE 5

Consumer Test Preference Results

| Cappuccino Mix Creamer | Chemical Carbonation | Extent of WPC Denaturation | Foam Texture | Overall Liking | Appearance of Foam Liking |
|---|---|---|---|---|---|
| B | yes | 66% | solid | 7.1 | 8.3 |
| D | yes | 15% | gas | 6.5 | 6.4 |
| G | yes | 31% | gas | 6.8 | 7.6 |
| B | no | 66% | solid | 6.7 | 6.4 |

Creamers B and D were identical in composition and differed only in their extent of whey protein denaturation, 66% and 15%, respectively. The cappuccino mix containing Creamer B (66% whey protein denaturation) and chemical carbonation was statistically preferred over the mix containing Creamer D (15% whey protein denaturation) with respect to "overall liking" and "appearance of foam".

Creamers D and C differed somewhat with respect to formulation and extent of denaturation. Creamer G was formulated with 5% starch and had twice the extent of denaturation resulting in 50% more foam generation which produced a statistical preference for "appearance of foam" relative to Creamer D, but essentially the same "overall liking".

The cappuccino mix formulated with Creamer B without chemical carbonation surprisingly achieved the same "appearance of foam" liking score as the mix formulated with Creamer D, even though it produced less than one-fourth the volume of foam. In this case, the enhanced appearance and texture of the lower-volume solid-texture foam of Creamer B was sufficient to match the liking of the much greater volume of Creamer D foam having the typical gaseous appearance and texture of foams characteristic of conventional instant cappuccino mixes.

In addition, the panelists answered a series of multiple-choice questions to indicate their degree of satisfaction with a variety of flavor, foam, and appearance attributes. Results are summarized in Table 6.

TABLE 6

Consumer Test Attribute Data Summary

| Finished Product Attribute | Cappuccino Mix Creamer | Not Enough (%) | Just Right (%) | Too Much (%) | JR/NE Ratio[1] | Relative Effectiveness[2] |
|---|---|---|---|---|---|---|
| Amount of Foam | B | 23 | 73 | 4 | 3.2 | 1 |
| | D | 73 | 25 | 1 | 0.3 | 1/9th |
| | G | 47 | 51 | 3 | 1.1 | 1/3rd |
| | B-no carb. | 72 | 27 | 1 | 0.4 | 1/8th |
| Foam Duration | B | 13 | 79 | 8 | 6.1 | 1 |
| | D | 87 | 13 | 0 | 0.1 | 1/41th |
| | G | 71 | 28 | 1 | 0.4 | 1/15th |
| | B-no carb. | 31 | 68 | 1 | 2.2 | 1/3rd |
| Creaminess | B | 17 | 76 | 7 | 4.5 | 1 |
| | D | 61 | 36 | 3 | 0.6 | 1/8th |
| | G | 45 | 48 | 7 | 1.1 | 1/4th |
| | B-no carb. | 35 | 57 | 8 | 1.6 | 1/3rd |

| | | Too Small | Just Right | Too Large | JR/TS Ratio[1] | Relative Effectiveness[2] |
|---|---|---|---|---|---|---|
| Bubble Size | B | 7 | 79 | 15 | 11.3 | 1 |
| | D | 53 | 44 | 3 | 0.8 | 1/14th |

TABLE 6-continued

Consumer Test Attribute Data Summary

|  |  |  |  |  |  |
|---|---|---|---|---|---|
| G | 23 | 69 | 8 | 3.0 | 1/4th |
| B-no carb. | 31 | 56 | 13 | 1.8 | 1/3rd |

[1] JR is Just Right;
NE is Not Enough;
TS is Too Small
[2] Relative Effectiveness is fraction of JR/NE or JR/TS relative to that of Creamer B mix.

The cappuccino mix formulated with the 66% denatured creamer (Creamer B) and chemical carbonation received higher "just right" scores on "foam duration" (6× higher), "amount of foam" (3× higher), "bubble size" (2× higher), and "creaminess" (2× higher) relative to the cappuccino mix formulated with the 15% denatured creamer (Creamer D). This confirms that there were great and easily recognized differences between these two creamers which were identical in composition and flavor, but denatured to different extents to produce foam heads having very different volume, texture, and appearance. Another surprising result was that the mix containing Creamer B without chemical carbonation received higher Relative Effectiveness scores on "foam duration", "creaminess", and "bubble size" than the mixes containing Creamers D and G, despite the much greater volume of foam generated by the latter products. Again, this was directly attributed to the greater liking of the solid foam produced by Creamer B.

In summary, the results of this test clearly indicate that foam volume, texture, and appearance significantly affect consumer liking. The principal finding is that sufficiently denaturing the whey protein in a creamer to produce a solid foam texture and appearance is a tool which can be used to greatly increase consumer liking. The cappuccino mix formulated with the 66% denatured creamer (Creamer B) and chemical carbonation was the clear statistical winner on overall liking of product, foam appearance, amount of foam, foam duration, foam bubble size, and beverage creaminess. In addition, except for the lower amount of foam produced, the cappuccino mix formulated with the same creamer without chemical carbonation was the next most effective on all other attributes reported, specifically foam duration, foam bubble size, and beverage creaminess. Taken individually and in aggregate, these findings demonstrate the utility of the novel product of this invention.

Initial foam height and foam texture for Creamers A through H are summarized in Table 7.

TABLE 7

Creamer Denaturation and Foaming Performance Summary

| Creamer | % Whey Protein | Extent of Denaturation | Initial Foam Height (mm) | Foam Texture |
|---|---|---|---|---|
| A | 12.0 | 49% | 22 | solid |
| B | 12.0 | 66% | 24 | solid |
| C | 12.0 | 74% | 25 | solid |
| D | 12.0 | 15% | 10 | gas |
| E | 4.0 | 70% | 24 | solid |
| F | 0 | N/A | 12 | gas |
| G | 12.0 | 31 | 15 | gas |
| H | 12.0 | 77% | 18 | solid |

What is claimed is:

1. In a particulate creamer comprising protein, lipid, and carrier, the improvement wherein more than 50% by weight of said protein is partially denatured whey protein, said partially denatured whey protein being from 40 to 90% denatured and wherein said particulate creamer is gasified or non-gasified having a bulk density of from 0.1 to 0.55 g/cc.

2. A creamer according to claim 1 wherein the partially denatured whey protein is from 50 to 80% denatured.

3. A creamer according to claim 1 wherein the partially denatured whey protein is from 60 to 75% denatured.

4. A creamer according to claim 1 wherein at least 67% by weight of said protein is said partially denatured whey protein.

5. A creamer according to claim 1 wherein at least 75% by weight of said protein is said partially denatured whey protein.

6. A creamer according to claim 1, further comprising chemical carbonation reagents.

7. A creamer according to claim 6, wherein said reagents comprise an acid and a bicarbonate or carbonate.

8. A creamer according to claim 1 wherein said protein comprises casein and wherein the weight ratio of denatured whey:casein is greater than 1:1.

9. A creamer according to claim 8 wherein said protein comprises casein and wherein the weight ratio of denatured whey:casein is greater than 2:1.

10. A creamer according to claim 8 wherein said protein comprises casein and wherein the weight ratio of denatured whey:casein is greater than 3:1.

11. A creamer according to claim 1 wherein said protein consists essentially of said partially denatured whey protein.

12. A creamer according to claim 1 wherein said protein is casein-free.

13. A creamer according to claim 1 comprising from 3 to 30% by weight protein, 5 to 50% by weight lipid, and 20 to 92% by weight carrier, based on the weight of the creamer.

14. A creamer according to claim 1 further comprising a sweetener.

15. A creamer according to claim 1 wherein said creamer is non-gasified having a bulk density of from 0.25 to 0.55 g/cc.

16. A creamer according to claim 1 wherein said creamer is gasified having a bulk density of from 0.1 to 0.25 g/cc.

17. A method of preparing a particulate creamer which comprises:
providing an aqueous spray-dryable slurry which comprises protein, lipid, and carrier, more than 50% by weight of said protein being whey protein;
heating said aqueous slurry at a temperature and for a time sufficient to partially denature said whey protein such that the partially denatured whey protein is 40 to 90% denatured;
and spray drying said aqueous slurry with or without gas injection to provide a particulate creamer having a bulk density of from 0.1 to 0.55 g/cc comprising protein, lipid, and carrier, wherein more than 50% of the protein of said creamer is partially denatured whey protein which is from 40 to 90% denatured.

18. A method according to claim 17 wherein said whey protein of said slurry comprises whey protein concentrate.

19. A method according to claim 17 wherein said whey protein of said slurry comprises whey protein isolate.

20. A method according to claim 17 wherein said partially denatured whey protein of said creamer is from 50 to 80% denatured.

21. A method according to claim 20 wherein said partially denatured whey protein of said creamer is from 60 to 75% denatured.

22. A method according to claim 17 wherein at least 67% of said protein of said creamer comprises said partially denatured whey protein.

23. A method according to claim 17 wherein at least 75% of said protein of said creamer comprises said partially denatured whey protein.

24. A method according to claim 17 wherein said protein of said creamer comprises casein and wherein the weight ratio of denatured whey:casein is greater than 1:1.

25. A method according to claim 17 wherein said protein of said creamer comprises casein and wherein the weight ratio of denatured whey:casein is greater than 2:1.

26. A method according to claim 17 wherein said protein of said creamer comprises casein and wherein the weight ratio of denatured whey:casein is greater than 3:1.

27. A method according to claim 17 wherein said protein of said creamer consists essentially of said partially denatured whey protein.

28. A method according to claim 17 wherein said protein of said creamer is casein-free.

29. A method according to claim 17 wherein said creamer comprises from 3 to 30% by weight protein, 5 to 50% by weight lipid, and 20 to 92% by weight carrier, based on the weight of the creamer.

30. A method according to claim 17 wherein said spray drying is without gas injection and said creamer has a bulk density of 0.25 g/cc to 0.55 g/cc.

31. In a particulate, dry mix, instant hot cappuccino composition comprising a water soluble coffee component and a particulate creamer component comprising protein, lipid, and carriers the improvement wherein more than 50% by weight of said protein of said creamer component is partially denatured whey protein, said partially denatured whey protein being from 40 to 90% denatured and wherein said particulate creamer is gasified or non-gasified having a bulk density of from 0.1 to 0.55 g/cc.

32. A cappuccino composition according to claim 31 wherein the partially denatured whey protein is from 50 to 80% denatured.

33. A cappuccino composition according to claim 31 wherein the partially denatured whey protein is from 60 to 75% denatured.

34. A cappuccino composition according to claim 31 wherein at least 67% by weight of said protein is said partially denatured whey protein.

35. A cappuccino composition according to claim 31 wherein at least 75% by weight of said protein is said partially denatured whey protein.

36. A cappuccino composition according to claim 31 wherein said protein comprises casein and wherein the weight ratio of denatured whey:casein is greater than 1:1.

37. A cappuccino composition according to claim 31 wherein said protein comprises casein and wherein the weight ratio of denatured whey:casein is greater than 2:1.

38. A cappuccino composition according to claim 31 wherein said protein comprises casein and wherein the weight ratio of denatured whey:casein is greater than 3:1.

39. A cappuccino composition according to claim 31 wherein said protein consists essentially of said partially denatured whey protein.

40. A cappuccino composition according to claim 31 wherein said protein is casein-free.

41. A cappuccino composition according to claim 31 wherein the creamer comprises from 3 to 30% by weight protein, 5 to 50% by weight lipid, and 20 to 92% by weight carrier, based on the weight of the creamer.

42. A cappuccino composition according to claim 31 wherein the creamer is non-gasified and has a bulk density of from 0.25 to 0.55 g/cc.

43. A cappuccino composition according to claim 31 wherein the creamer is gasified and has a bulk density of from 0.1 to 0.25 g/cc.

44. A cappuccino composition according to claim 31 further comprising chemical carbonation reagents.

45. A cappuccino composition according to claim 44 wherein said reagents comprise an acid and a bicarbonate or carbonate.

46. A cappuccino composition according to claim 31 further comprising a sweetener component.

* * * * *